United States Patent
Chigan et al.

(10) Patent No.: US 10,868,318 B2
(45) Date of Patent: Dec. 15, 2020

(54) FLOW BATTERY CONTROL METHOD, FLOW BATTERY CONTROL SYSTEM AND FLOW BATTERY

(71) Applicant: DALIAN RONGKEPOWER CO., LTD, Liaoning (CN)

(72) Inventors: Ting Chigan, Liaoning (CN); Huamin Zhang, Liaoning (CN); Xiangkun Ma, Liaoning (CN); Jingbo Wu, Liaoning (CN); Shanqiang Lv, Liaoning (CN); Ning Chen, Liaoning (CN)

(73) Assignee: DALIAN RONGKEPOWER CO., LTD, Liaoning (CN)

( * ) Notice: Subject to any disclaimer, the term of this patent is extended or adjusted under 35 U.S.C. 154(b) by 148 days.

(21) Appl. No.: 16/085,143

(22) PCT Filed: Mar. 14, 2016

(86) PCT No.: PCT/CN2016/076291
§ 371 (c)(1),
(2) Date: Nov. 15, 2018

(87) PCT Pub. No.: WO2017/156680
PCT Pub. Date: Sep. 21, 2017

(65) Prior Publication Data
US 2019/0260050 A1 Aug. 22, 2019

(51) Int. Cl.
*H01M 8/04992* (2016.01)
*H01M 8/0432* (2016.01)
*H01M 8/04537* (2016.01)
*H01M 8/04701* (2016.01)
*H01M 8/04858* (2016.01)
*H01M 8/18* (2006.01)
*H01M 8/04* (2016.01)

(52) U.S. Cl.
CPC ......... *H01M 8/04992* (2013.01); *H01M 8/04* (2013.01); *H01M 8/0488* (2013.01); *H01M 8/04328* (2013.01); *H01M 8/04335* (2013.01); *H01M 8/04559* (2013.01); *H01M 8/04619* (2013.01); *H01M 8/04701* (2013.01); *H01M 8/188* (2013.01)

(58) Field of Classification Search
None
See application file for complete search history.

(56) References Cited

U.S. PATENT DOCUMENTS

2014/0272653 A1 9/2014 Chaturvedi et al.

FOREIGN PATENT DOCUMENTS

CN 105388127 A 3/2016

*Primary Examiner* — Sarah A. Slifka
(74) *Attorney, Agent, or Firm* — Novick, Kim & Lee, PLLC; Allen Xue

(57) ABSTRACT

A flow battery has a control system and a control method to control the operation of the flow battery. The control method includes disposing an SOC detection device respectively at a positive electrolyte outlet and a negative electrolyte outlet of a cell stack; obtaining, by the SOC detection devices, SOCs at the electrolyte outlets of the cell stack under an initial state of the flow battery; at every preset time, acquiring the volume of electrolyte in the positive electrolyte storage tank, the volume of electrolyte in the negative electrolyte storage tank, the volume of the electrolyte flowing into the positive electrolyte storage tank, and the volume of the electrolyte flowing into the negative electrolyte storage tank, and meanwhile, obtaining, by the SOC detection devices, SOCs at the electrolyte outlets of the cell stack; and obtaining SOC of the flow battery.

15 Claims, 10 Drawing Sheets

FLOW BATTERY CONTROL METHOD, FLOW BATTERY CONTROL SYSTEM AND FLOW BATTERY

TECHNICAL FIELD

The present invention belongs to the field of flow batteries, in particular to a flow battery control method, a flow battery control system and a flow battery.

BACKGROUND ART

A flow battery has numerous advantages, such as flexible design (power and capacity can be designed independently), long service life, good charge and discharge performances, free site selection, high energy efficiency, safety and environmental protection, low maintenance cost and easy realization of large-scale storage than other conventional batteries possess. In practical applications, the flow battery can be widely used as an energy storage system for renewable energy power generation systems such as wind energy and solar energy, so that the generated electric power can be continuously and stably outputted; the flow battery can also be used to cut peaks and fill valleys for an electric grid, store the electric power at the valley of electricity consumption, and output it at the peak of electricity consumption to balance the supply and demand of electricity; the flow battery can also be used as an emergency power supply system, a backup power station or the like, and is thus considered to be one of the most commercially promising energy storage technologies. At present, a number of countries have successively built kW-MW-class flow battery demonstration systems, which are used in renewable energy power generation systems, such as solar energy or wind energy to play roles of smoothing output, tracking planned power generation, balancing load, cutting peaks and filling valleys, and the like.

The flow battery in the prior art has the following problems:

1. during the operation of the flow battery, the electrolyte in the positive and negative electrolyte storage tanks flows through liquid delivery pipelines and cell stacks under the impetus of a circulation pump, and undergoes an electrochemical reaction in the cell stacks, such that the concentration of active materials of electrolyte entering the cell stacks changes, and then the electrolyte returns to the positive and negative electrolyte storage tanks and is mixed with the electrolyte in the storage tanks. Since there is a certain distance between an electrolyte outlet and an electrolyte inlet of the positive and negative electrode electrolyte storage tanks, the SOCs of the electrolyte in the positive and negative electrolyte storage tanks are distributed in a gradient when the flow battery is charged and discharged. Since SOC of the electrolyte at the inlet or outlet of the cell stack is only considered in an SOC detection method of the flow battery in the prior art, rather than a comprehensive consideration of SOC conditions of all the electrolyte in the electrolyte storage tanks, the detection results are not accurate and cannot reflect the actual SOC of the flow battery.

2. There are many operating state parameters of the flow battery. At present, the electrolyte flow control of the flow battery is relatively simple. The circulation pump is controlled only according to the output power requirements, and different demands of different electrolyte temperatures, SOCs, capacity decay rates and charge and discharge powers on reactants of the electrolyte are not considered. Therefore, the flow battery cannot intelligently control the electrolyte flow rate with reference to various operating state parameters, resulting in increased power consumption of the circulation pump and reducing the efficiency of the flow battery.

3. When the flow battery is being charged, the charge cutoff condition is usually achieved by setting the upper limit of a charge voltage. The upper limit of the charge voltage in the prior art is set to a fixed value. Since the flow battery is prone to side reactions under a high SOC condition, long-term high SOC charging can cause the capacity decay of the flow battery. In addition, under a low SOC condition, the flow battery cannot achieve more power input due to the limited cutoff voltage, which causes the chargeable capacity and energy efficiency of the flow battery to be affected.

4. The flow battery generates a certain amount of heat during the charging and discharging operations, and the prior art does not fully consider the heat dissipation problem of the flow battery. If the heat accumulated in the cell stacks and electrolyte cannot be dissipated as soon as possible, the long-term thermal shock will harm the performances of key materials (electrodes, bipolar plates, electrolytes, etc.) and electrolyte circulation system components (pipe fittings, valves, etc.), thereby reducing the long-term operation reliability of the flow battery.

SUMMARY OF THE INVENTION

The present invention provides a flow battery control method, a flow battery control system and a flow battery with respect to the above problems.

The present invention adopts the following technical means:

a flow battery control method comprises the following steps:

step B1: disposing an SOC detection device respectively at a positive electrolyte outlet and a negative electrolyte outlet of an cell stack;

step B2: obtaining, by the SOC detection devices, SOCs at the electrolyte outlets of the cell stack under an initial state of the flow battery;

step B3: at every preset time, acquiring the volume of electrolyte in the positive electrolyte storage tank, the volume of electrolyte in the negative electrolyte storage tank, the volume of electrolyte flowing into the positive electrolyte storage tank, and the volume of electrolyte flowing into the negative electrolyte storage tank, and meanwhile, obtaining, by the SOC detection devices, SOCs at the electrolyte outlet of the cell stack; and step B4: obtaining SOC of the flow battery according to the volume of the electrolyte in the positive electrolyte storage tank, the volume of the electrolyte in the negative electrolyte storage tank, the volume of the electrolyte flowing into the positive electrolyte storage tank, the volume of the electrolyte flowing into the negative electrolyte storage tank, which are acquired at each time, and the SOCs at the electrolyte outlets of the cell stack, and in combination with the SOCs at the electrolyte outlets of the cell stack under the initial state of the flow battery.

Further, the SOC of the flow battery is calculated according to the following formula, $$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$

-continued $$\frac{\Delta V_1}{V_1}*\left(1-\frac{\Delta V_2}{V_2}\right)*\left(1-\frac{\Delta V_3}{V_3}\right)*\ldots*\left(1-\frac{\Delta V_i}{V_i}\right)*\ldots*\left(1-\frac{\Delta V_n}{V_n}\right)*SOC_1 +$$

$$\frac{\Delta V_2}{V_2}*\left(1-\frac{\Delta V_3}{V_3}\right)*\left(1-\frac{\Delta V_4}{V_4}\right)*\ldots*\left(1-\frac{\Delta V_i}{V_i}\right)*\ldots*\left(1-\frac{\Delta V_n}{V_n}\right)*SOC_2 +$$

$$\ldots + \frac{\Delta V_i}{V_i}*\left(1-\frac{\Delta V_{i+1}}{V_{i+1}}\right)*\left(1-\frac{\Delta V_{i+2}}{V_{i+2}}\right)*\ldots*\left(1-\frac{\Delta V_n}{V_n}\right)*SOC_i +$$

$$\ldots + \frac{\Delta V_{n-1}}{V_{n-1}}*\left(1-\frac{\Delta V_n}{V_n}\right)*SOC_{n-1} + \frac{\Delta V_n}{V_n}*SOC_n$$

in the formula, $$V_i = \frac{V_{pi}+V_{ni}}{2}, \Delta V_i = \frac{\Delta V_{pi}+\Delta V_{ni}}{2},$$

wherein $V_{pi}$ represent the volume of the electrolyte in the positive electrolyte storage tank after the elapse of time i*Δt from the operation of the flow battery; $V_{ni}$ represents the volume of the electrolyte in the negative electrolyte storage tank after the elapse of time i*Δt; $\Delta V_{pi}$ represents the volume of the electrolyte flowing into the positive electrolyte storage tank within the ith Δt time; $\Delta V_{ni}$ represents the volume of the electrolyte flowing into the negative electrolyte storage tank within the ith Δt time; $SOC_i$ represents the SOC at the electrolyte outlet of the cell stack obtained by the SOC detection device after the elapse of time i*Δt from the operation the flow battery; i is 1, 2, . . . , n; n represents the number of the Δt time elapsed;

Further, the control method further comprises the following steps:

step F1: acquiring a current electrolyte temperature, SOC, a charge power or discharge power, and an electrolyte capacity decay rate of the flow battery;

step F2: determining an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;

step F3: obtaining an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and step F4: adjusting the current electrolyte flow rate of the flow battery to obtain the optimal electrolyte flow rate.

In addition, the control method further comprises the following steps:

step G1: acquiring a current electrolyte temperature, SOC, a charge power or discharge power, and an electrolyte capacity decay rate of the flow battery;

step G2: determining an electrolyte temperature interval to which the current electrolyte temperature of the flow battery belongs, an SOC interval to which the current SOC belongs, a charge power interval to which the current charge power belongs, or a discharge power interval to which the current discharge power belongs, and a capacity decay rate interval to which the current electrolyte capacity decay rate belongs;

step G3: obtaining a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and step G4: adjusting the current difference between the volumes of the positive electrolyte and the negative electrolyte of the flow battery to obtain the optimal difference between volumes of the positive electrolyte and the negative electrolyte;

In addition, the control method further comprises the following steps:

step H1: detecting SOC of the flow battery;

step H2: determining whether the SOC of the flow battery is between an SOC lower limit and an SOC upper limit, if so, executing step H3, or executing step H4;

step H3: keeping a voltage of the flow battery unchanged; and step 4: adjusting a voltage of the flow battery to be lower than a first preset voltage when the SOC of the flow battery is greater than or equal to the SOC upper limit, and adjusting the voltage of the flow battery to be between the first preset voltage and a second preset voltage when the SOC of the flow battery is less than or equal to the SOC lower limit, the second preset voltage being higher than the first preset voltage.

In addition, the control method further comprises the following steps:

step I1: detecting a voltage of the flow battery and a voltage of each cell stack included in the flow battery, and executing step I2;

step I2: determining whether the difference between the voltages of any two cell stacks is greater than or equal to a first voltage threshold, if so, executing step I3, or returning to step I2;

step I3: lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state, and executing step I4; and step I4: determining whether the difference between the voltages of any two cell stacks is greater than or equal to a second voltage threshold, if so, powering off the flow battery, or returning to step I2.

In addition, the control method further comprises the following steps:

when the flow battery operates, controlling a natural heat dissipation device to work, and meanwhile detecting the electrolyte temperature; and initiating a forced heat dissipation device when the electrolyte temperature reaches a temperature upper limit, and powering off the forced heat dissipation device when the electrolyte temperature reaches a temperature lower limit.

In addition, the control method further comprises the following steps:

step K1: determining whether the flow battery is powered off, if so, executing step K1, or returning to step K1;

step K2: controlling the flow battery to continue to supply electric energy to a load and/or a battery assistance device, and executing K3, wherein the load is a load which is connected when the flow battery operates normally;

step K3: determining whether the flow battery supplies electric energy to the load and/or the battery assistance device, if so, executing step K4, or executing step K7;

step K4: detecting a discharge power of the flow battery, and executing step K5;

step K5: determining whether the discharge power of the flow battery reaches a discharge power threshold, if so, executing step K7 and ending directly, or returning to step K3; and step K7: executing forced electric leakage protection, and ending.

A flow battery control system comprises:

SOC detection devices which are disposed at a positive electrode outlet and a negative electrolyte outlet of an cell stack and configured to obtain SOCs at the electrolyte outlets of the cell stack under an initial state of the flow battery and obtain SOCs at the electrolyte outlets of the cell stack at every a preset time;

a third acquisition unit configured to acquire the volume of electrolyte in a positive electrolyte storage tank, the volume of electrolyte in a negative electrolyte storage tank, the volume of electrolyte flowing into the positive electrolyte storage tank and the volume of electrolyte flowing into the negative electrolyte storage tank at every a preset time; and a first processing unit configured to obtain SOC of the flow battery according to the volume of the electrolyte in the positive electrolyte storage tank, the volume of the electrolyte in the negative electrolyte storage tank, the volume of the electrolyte flowing into the positive electrolyte storage tank and the volume of the electrolyte flowing into the negative electrolyte storage tank, which are acquired by the third acquisition unit at each time, and the SOCs at the electrolyte outlets of the cell stack, which are obtained by the SOC detection device, and in combination with the SOCs at the electrolyte outlets of the cell stack under the initial state of the flow battery.

Further, the first processing unit calculates the SOC of the flow battery according to the following formula:

$$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$
$$\frac{\Delta V_1}{V_1} * \left(1 - \frac{\Delta V_2}{V_2}\right) * \left(1 - \frac{\Delta V_3}{V_3}\right) * \ldots * \left(1 - \frac{\Delta V_i}{V_i}\right) * \ldots * \left(1 - \frac{\Delta V_n}{V_n}\right) * SOC_1 +$$
$$\frac{\Delta V_2}{V_2} * \left(1 - \frac{\Delta V_3}{V_3}\right) * \left(1 - \frac{\Delta V_4}{V_4}\right) * \ldots * \left(1 - \frac{\Delta V_i}{V_i}\right) * \ldots * \left(1 - \frac{\Delta V_n}{V_n}\right) * SOC_2 +$$
$$\ldots + \frac{\Delta V_i}{V_i} * \left(1 - \frac{\Delta V_{i+1}}{V_{i+1}}\right) * \left(1 - \frac{\Delta V_{i+2}}{V_{i+2}}\right) * \ldots * \left(1 - \frac{\Delta V_n}{V_n}\right) * SOC_i +$$
$$\ldots + \frac{\Delta V_{n-1}}{V_{n-1}} * \left(1 - \frac{\Delta V_n}{V_n}\right) * SOC_{n-1} + \frac{\Delta V_n}{V_n} * SOC_n$$

in the formula, $$V_i = \frac{V_{pi} + V_{ni}}{2}, \Delta V_i = \frac{\Delta V_{pi} + \Delta V_{ni}}{2},$$

wherein $V_{pi}$ represent the volume of the electrolyte in the positive electrolyte storage tank after the elapse of time $i*\Delta t$ from the operation of the flow battery; $V_{ni}$ represents the volume of the electrolyte in the negative electrolyte storage tank after the elapse of time $i*\Delta t$; $\Delta V_{pi}$ represents the volume of the electrolyte flowing into the positive electrolyte storage tank within the ith $\Delta t$ time; $\Delta V_{ni}$ represents the volume of the electrolyte flowing into the negative electrolyte storage tank within the ith $\Delta t$ time; $SOC_i$ represents the SOC at the electrolyte outlet of the cell stack obtained by the SOC detection device after the elapse of time $i*\Delta t$ from the operation the flow battery; i is 1, 2, . . . n; n represents the number of the $\Delta t$ time elapsed.

Further, the control system also comprises:

a first acquisition unit configured to acquire a current electrolyte capacity decay rate of the flow battery;

a second monitoring unit configured to detect an electrolyte temperature;

a third monitoring unit configured to detect SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;

a third processing unit connected with the first determination unit and configured to obtain an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and a second control unit connected with the third processing unit and configured to adjust the current electrolyte flow rate of the flow battery to obtain the optimal electrolyte flow rate.

In addition, the control system further comprises:

a first acquisition unit configured to acquire a current electrolyte capacity decay rate of the flow battery;

a second monitoring unit configured to detect an electrolyte temperature;

a third monitoring unit configured to detect SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs, or a discharge power interval to which the current discharge power belongs, and a capacity decay rate interval to which the current electrolyte capacity decay rate belongs;

a fourth processing unit connected with the first determination unit and configured to obtain a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte.

Further, the control system also comprises:

a third monitoring unit configured to detect SOC of the flow battery;

a third determination unit connected with the third monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit; and a fourth control unit connected with the third determination unit and configured to adjust a voltage of the flow battery to be lower than a first preset voltage when the SOC of the flow battery is greater than or equal to the SOC upper limit, and adjust the voltage of the flow battery to be between the first preset voltage and a second preset voltage when the SOC of the flow battery is less than or equal to the SOC lower limit, the second preset voltage being higher than the first preset voltage.

Further, the control system also comprises:

a first monitoring unit configured to detect a voltage of the flow battery and a voltage of each cell stack included in the flow battery;

a fourth determination unit connected with the first monitoring unit and configured to determine whether the difference between the voltages of any two cell stacks is greater than or equal to a first voltage threshold;

a fifth control unit connected with the fourth determination unit and configured to, after the fourth determination unit obtains a determination result that the difference between the voltages of any two cell stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state; and a fifth determination unit connected with the fifth control unit and configured to, after the fifth control unit lowers the upper limit of the charge voltage of the flow battery and adjusts the charge current of the flow battery, or lowers the upper limit of the charge voltage of the flow battery and adjusts the charge current of the flow battery, determine whether the difference between the voltages of any two cell stacks is greater than or equal to a second voltage threshold; the fifth control unit controls the flow battery to power off according to the determination result obtained by the fifth determination unit that the difference between the voltages of any two cell stacks is greater than or equal to the second voltage threshold; the fourth determination unit is configured to, after the fifth determination unit obtains a determination result that the difference between the voltages of any two cell stacks is less than the second voltage threshold, continue to determine whether the difference between the voltages of any two cell stacks is greater than or equal to the first voltage threshold.

Further, the control system also comprises:

a second monitoring unit configured to detect an electrolyte temperature;

a natural heat dissipation device and a forced heat dissipation device;

a third comparison unit connected with the second monitoring unit and configured to compare the electrolyte temperature detected by the second monitoring unit with a temperature upper limit and a temperature lower limit respectively; and a sixth control unit connected with the third comparison unit and configured to control the natural heat dissipation device to work when the flow battery operates, initiate the forced heat dissipation device when the electrolyte temperature reaches the temperature upper limit and powers off the forced heat dissipation device when the electrolyte temperature reaches the temperature lower limit.

Further, the control system further comprises:

a sixth determination unit configured to determine whether the flow battery is powered off;

a seventh control unit connected with the sixth determination unit and configured to control the flow battery to continue to supply electric energy to a load and/or a battery assistance device after the flow battery is powered off, wherein the load is a load which is connected when the flow battery operates normally; after the flow battery is powered off, if the flow battery does not supply electric energy to the load and/or the battery assistance device, the seventh control unit performs a forced electric leakage protection operation on the flow battery;

a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold; when the discharge power of the flow battery reaches the discharge power threshold, the seventh control unit performs the forced electric leakage protection operation on the flow battery or the control system stops working.

A flow battery comprises the flow battery control system of any one of the preceding items.

Due to the adoption of the above technical solution, compared with the prior art, the flow battery control method, the flow battery control system and the flow battery provided by the present invention have the following advantages:

1. in consideration that the SOCs of the electrolyte in the positive electrolyte storage tank and the electrolyte in the negative electrolyte storage tank are distributed in a gradient when the flow battery is charged or discharged, the SOC detection results of the positive and negative electrolyte storage tanks within a certain period of time are accumulated and averaged, so that the SOC detection results are more accurate.

2. The difference of the volumes of the positive electrolyte and the negative electrolyte is configured and the corresponding electrolyte flow rate is controlled according to current operating state parameters of the flow battery, continuous operation of the flow battery under an optimal condition can be ensured, the flow rate requirements of the flow battery can be satisfied, and the power consumption of a circulation pump can be reduced.

3. When the flow battery is charged or discharged, the upper limit of the charge voltage and the lower limit of the discharge voltage can be set according to the current SOC of the flow battery; the problem that the flow battery is prone to side reactions under a high SOC condition and capacity decay while charged for a long time under a high SOC condition is avoided; under a low SOC condition, the charge capacity can be increased by increasing the upper limit of the charge voltage to improve the charging efficiency and the discharging efficiency on the promise that the voltage of the flow battery is endurable.

BRIEF DESCRIPTION OF THE DRAWINGS

In order to more clearly illustrate the embodiments of the present invention or the technical solutions in the prior art, the drawings used in the embodiments or the prior art description will be briefly described below. It is apparent that the drawings in the following description are some embodiments of the present invention, and other drawings may also be obtained by those of ordinary skill in the art according to these drawings, without paying creative work.

Figure 1:
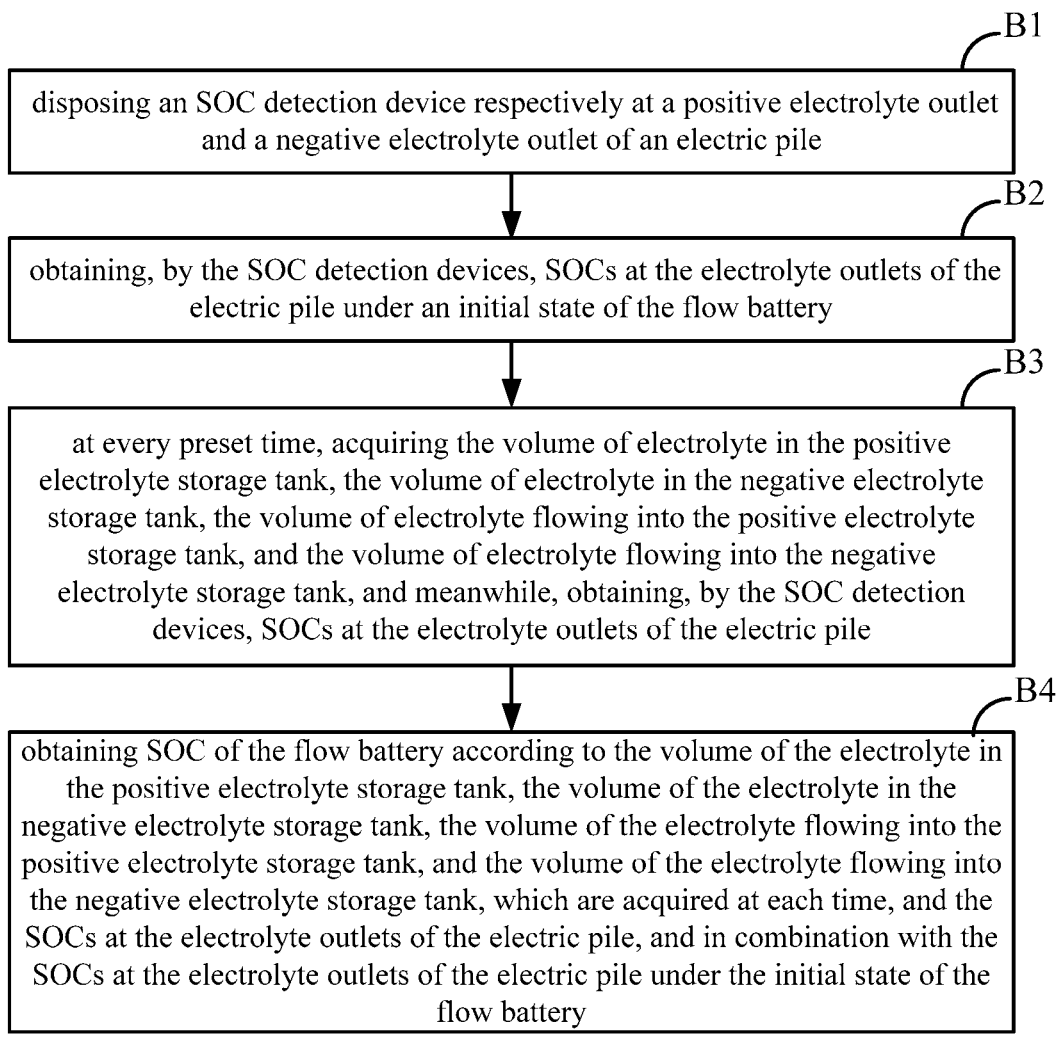
FIG. 1 is a flowchart from step B1 to step B4 in the control method of the present invention.

In the drawings, numerical symbols represent the following components: 3—positive electrolyte storage tank; 4—negative electrolyte storage tank; 5—circulation pump; 6—cell stack; 8—SOC detection device.

DETAILED DESCRIPTIONS OF THE PREFERRED EMBODIMENTS

In order to illustrate the objectives, technical solutions and advantages of the embodiments of the present invention more clearly, the technical solutions in the embodiments of the present invention are clearly and completely described below with reference to the accompanying drawings in the embodiments of the present invention. It is apparent that the described embodiments are a part of the embodiments of the present invention, rather than all of the embodiments. All other embodiments obtained by those of ordinary skill in the art based on the embodiments of the present invention without paying creative work fall within the protection scope of the present invention.

As shown in FIG. 1, a flow battery control method comprises the following steps: step B1: disposing an SOC detection device respectively at a positive electrolyte outlet and a negative electrolyte outlet of an cell stack;

step B2: obtaining, by the SOC detection devices, SOCs at the electrolyte outlets of the cell stack under an initial state of the flow battery;

step B3: at every preset time, acquiring the volume of electrolyte in the positive electrolyte storage tank, the volume of electrolyte in the negative electrolyte storage tank, the volume of electrolyte flowing into the positive electrolyte storage tank, and the volume of electrolyte flowing into the negative electrolyte storage tank, and meanwhile, obtaining, by the SOC detection devices, SOCs at the electrolyte outlets of the cell stack; and step B4: obtaining SOC of the flow battery according to the volume of the electrolyte in the positive electrolyte storage tank, the volume of the electrolyte in the negative electrolyte storage tank, the volume of the electrolyte flowing into the positive electrolyte storage tank and the volume of the electrolyte flowing into the negative electrolyte storage tank, which are acquired at each time, and the SOCs at the electrolyte outlets of the cell stack, and in combination with the SOCs at the electrolyte outlets of the cell stack under the initial state of the flow battery.

Further, the SOC of the flow battery is calculated according to the following formula, $$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$

$$\frac{\Delta V_1}{V_1} * \left(1 - \frac{\Delta V_2}{V_2}\right) * \left(1 - \frac{\Delta V_3}{V_3}\right) * \ldots * \left(1 - \frac{\Delta V_i}{V_i}\right) * \ldots * \left(1 - \frac{\Delta V_n}{V_n}\right) * SOC_1 +$$

$$\frac{\Delta V_2}{V_2} * \left(1 - \frac{\Delta V_3}{V_3}\right) * \left(1 - \frac{\Delta V_4}{V_4}\right) * \ldots * \left(1 - \frac{\Delta V_i}{V_i}\right) * \ldots * \left(1 - \frac{\Delta V_n}{V_n}\right) * SOC_2 +$$

$$\ldots + \frac{\Delta V_i}{V_i} * \left(1 - \frac{\Delta V_{i+1}}{V_{i+1}}\right) * \left(1 - \frac{\Delta V_{i+2}}{V_{i+2}}\right) * \ldots * \left(1 - \frac{\Delta V_n}{V_n}\right) * SOC_i +$$

$$\ldots + \frac{\Delta V_{n-1}}{V_{n-1}} * \left(1 - \frac{\Delta V_n}{V_n}\right) * SOC_{n-1} + \frac{\Delta V_n}{V_n} * SOC_n$$

in the formula, $$V_i = \frac{V_{pi} + V_{ni}}{2}, \Delta V_i = \frac{\Delta V_{pi} + \Delta V_{ni}}{2},$$

wherein $V_{pi}$ represent the volume of the electrolyte in the positive electrolyte storage tank after the elapse of time $i*\Delta t$ from the operation of the flow battery; $V_{ni}$ represents the volume of the electrolyte in the negative electrolyte storage tank after the elapse of time $i*\Delta t$; $\Delta V_{pi}$ represents the volume of the electrolyte flowing into the positive electrolyte storage tank within the ith $\Delta t$ time; $\Delta V_{ni}$ represents the volume of the electrolyte flowing into the negative electrolyte storage tank within the ith $\Delta t$ time; $SOC_i$ represents the SOC at the electrolyte outlet of the cell stack obtained by the SOC detection device after the elapse of time $i*\Delta t$; from the operation the flow battery; i is 1, 2, . . . n; n represents the number of the $\Delta t$ time elapsed.

Figure 2:
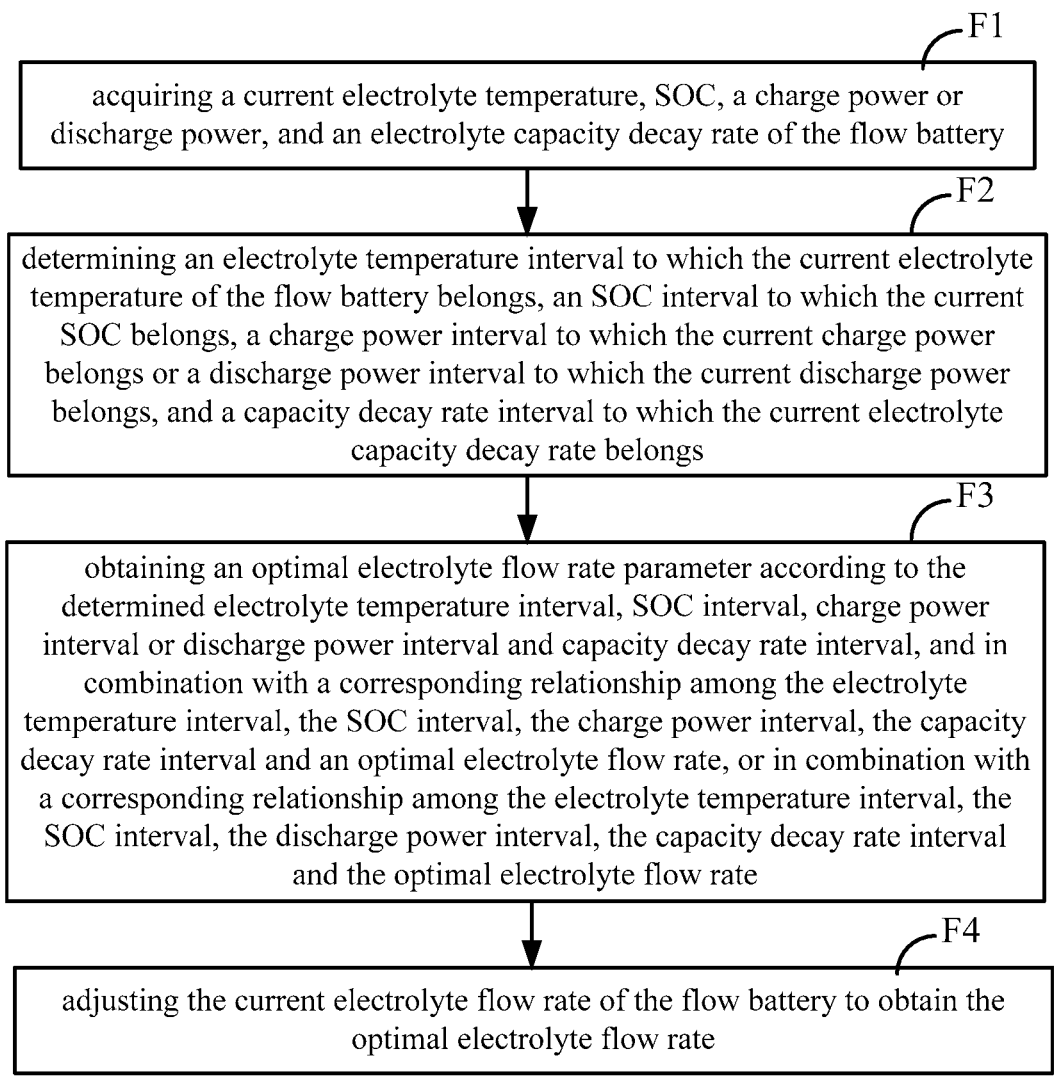
FIG. 2 is a flowchart from step F1 to step F4 in the control method of the present invention.

As shown in FIG. 2, further, the control method also comprises the following steps:

step F1: acquiring a current electrolyte temperature, SOC, a charge power or discharge power, and an electrolyte capacity decay rate of the flow battery;

step F2: determining an electrolyte temperature interval to which the current electrolyte temperature of the flow battery belongs, an SOC interval to which the current SOC belongs, a charge power interval to which the current charge power belong or a discharge power interval to which the current discharge power belongs, and a capacity decay rate interval to which the current electrolyte capacity decay rate belongs;

step F3: obtaining an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and step F4: adjusting the current electrolyte flow rate of the flow battery to obtain the optimal electrolyte flow rate.

Figure 3:
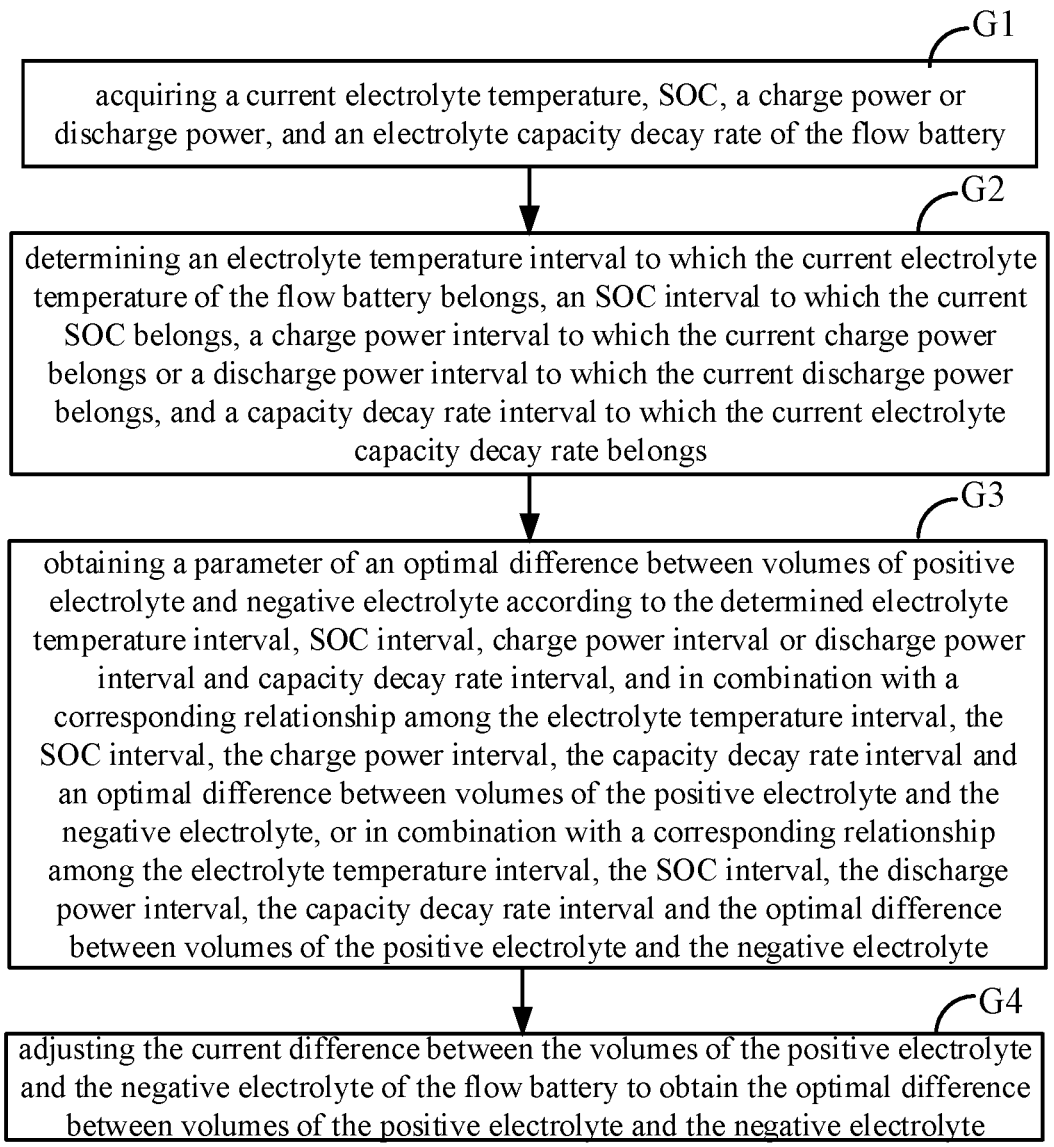
FIG. 3 is a flowchart from step G1 to step G4 in the control method of the present invention.

As shown in FIG. 3, further, the control method also comprises the following steps:

step G1: acquiring a current electrolyte temperature, SOC, a charge power or discharge power, and an electrolyte capacity decay rate of the flow battery;

step G2: determining an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;

step G3: obtaining a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and step G4: adjusting the current difference between the volumes of the positive electrolyte and the negative electrolyte of the flow battery to obtain the optimal difference between volumes of the positive electrolyte and the negative electrolyte.

Figure 4:
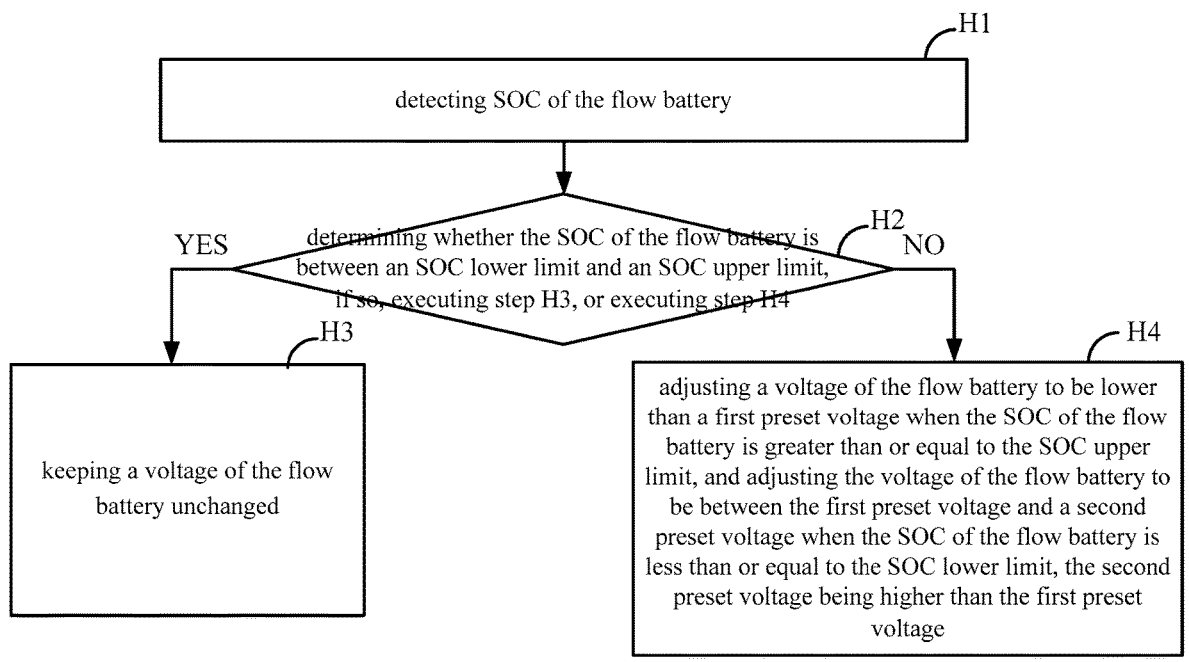
FIG. 4 is a flowchart from step H1 to step H4 in the control method of the present invention.

As shown in FIG. 4, further, the control method further comprises the following steps:

step H1: detecting SOC of the flow battery;

step H2: determining whether the SOC of the flow battery is between an SOC lower limit and an SOC upper limit, if so, executing step H3, or executing step H4;

step H3: keeping a voltage of the flow battery unchanged; and step H4: adjusting a voltage of the flow battery to be lower than a first preset voltage when the SOC of the flow battery is greater than or equal to the SOC upper limit, and adjusting the voltage of the flow battery to be between the first preset voltage and a second preset voltage when the SOC of the flow battery is less than or equal to the SOC lower limit, the second preset voltage being higher than the first preset voltage.

Figure 5:
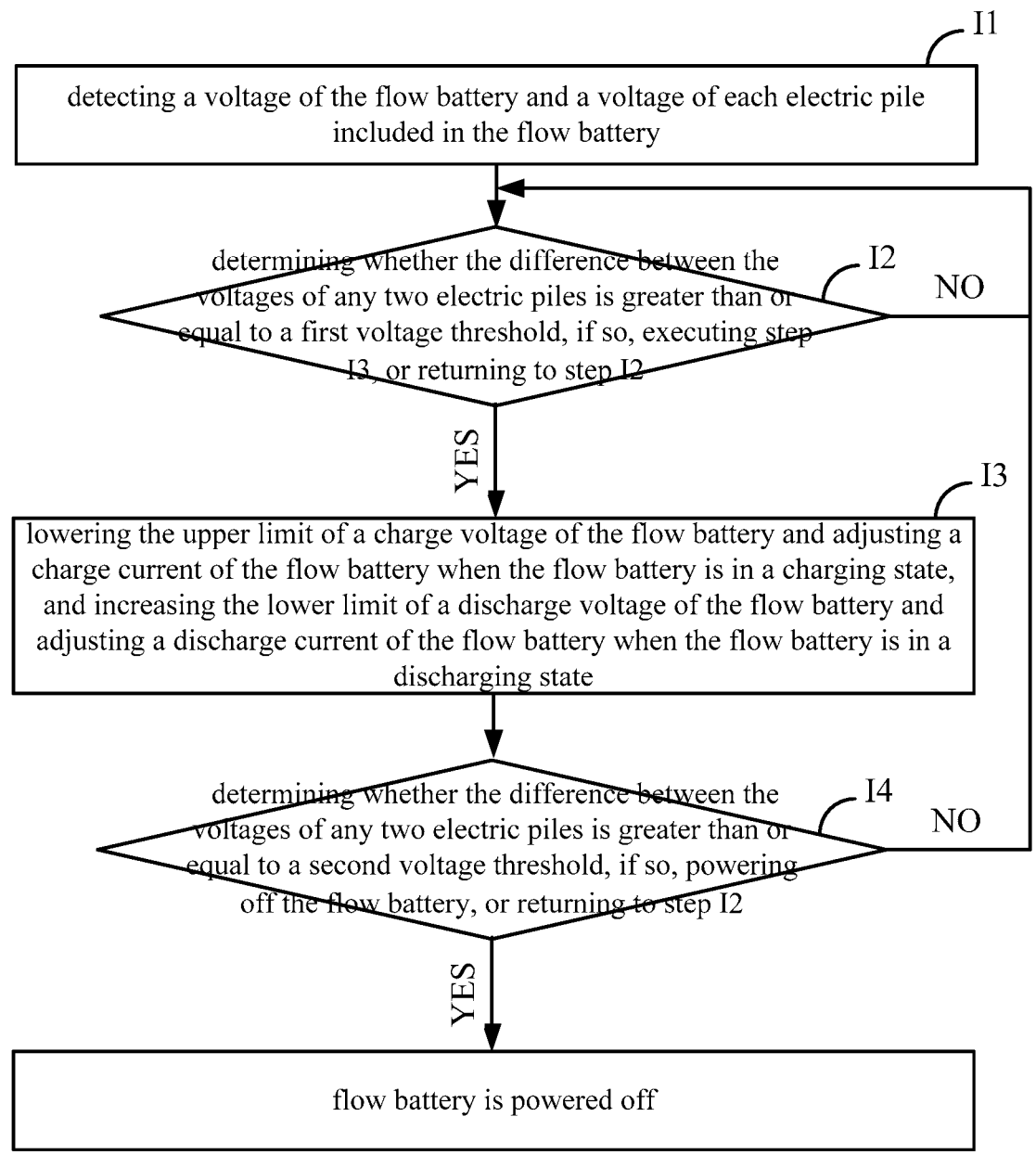
FIG. 5 is a flowchart from step I1 to step I5 in the control method of the present invention.

As shown in FIG. 5, further, the control method also comprises the following steps:

step I1: detecting a voltage of the flow battery and a voltage of each cell stack included in the flow battery, and executing step I2;

step I2: determining whether the difference between the voltages of any two cell stacks is greater than or equal to a first voltage threshold, if so, executing step I3, or returning to step I2;

step I3: lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state, and executing step I4; and step I4: determining whether the difference between the voltages of any two cell stacks is greater than or equal to a second voltage threshold, if so, powering off the flow battery, or returning to step I2.

In addition, the control method further comprises the following steps:

when the flow battery operates, controlling a natural heat dissipation device to work, and meanwhile detecting the electrolyte temperature; and initiating a forced heat dissipation device when the electrolyte temperature reaches a temperature upper limit, and powering off the forced heat dissipation device when the electrolyte temperature reaches a temperature lower limit.

Figure 6:
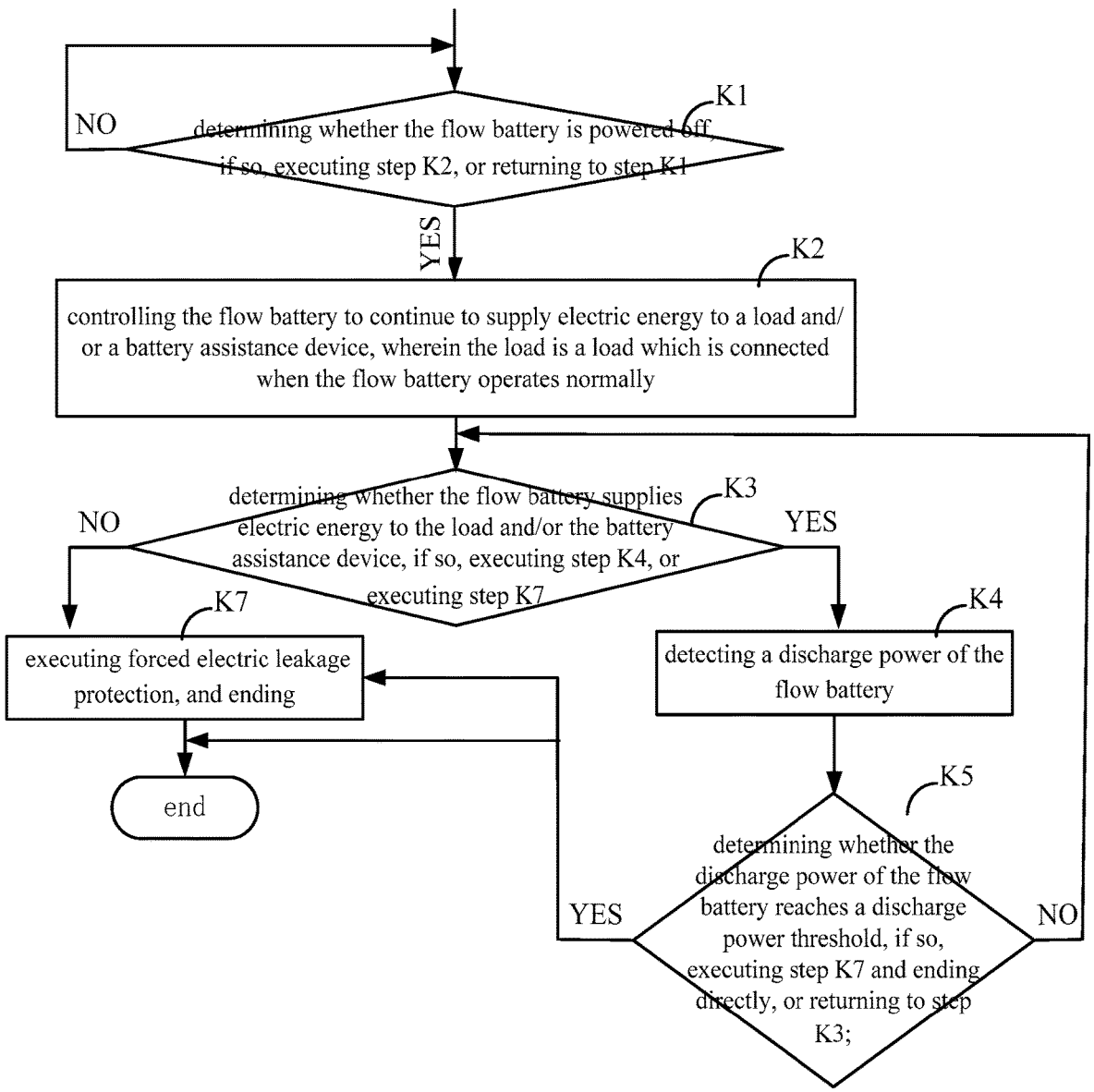
FIG. 6 is a flowchart from step K1 to step K7 in the control method of the present invention.

As shown in FIG. 6, further, the control method also comprises the following steps:

step K1: determining whether the flow battery is powered off, if so, executing step K2, or returning to step K1;

step K2: controlling the flow battery to continue to supply electric energy to a load and/or a battery assistance device, and executing K3, wherein the load is a load which is connected when the flow battery operates normally;

step K3: determining whether the flow battery supplies electric energy to the load and/or the battery assistance device, if so, executing step K4, or executing step K7;

step K4: detecting a discharge power of the flow battery, and executing step K5;

step K5: determining whether the discharge power of the flow battery reaches a discharge power threshold, if so, executing step K7 and ending directly, or returning to step K3; and step K7: executing forced electric leakage protection, and ending.

Figure 7:
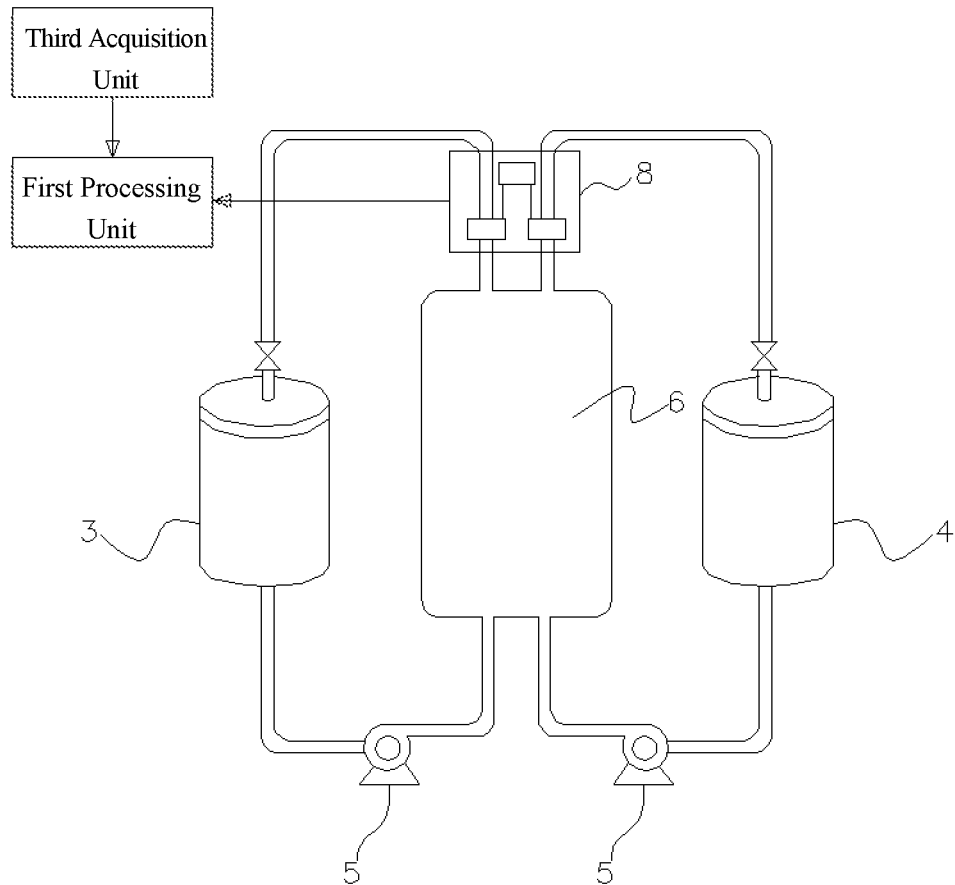
FIG. 7 is a structural schematic diagram of a flow battery control system according to Embodiment 1 of the present invention.

The present invention supplies a flow battery control system. FIG. 7 is a structural schematic diagram of a flow battery control system according to Embodiment 1 of the present invention. As shown in FIG. 7, the control system further comprises: SOC detection devices 8 which are disposed at a positive electrode outlet and a negative electrolyte outlet of an cell stack 6 and configured to obtain SOCs at the electrolyte outlets of the cell stack 6 under an initial state of the flow battery and obtain SOCs at the electrolyte outlets of the cell stack 6 at every a preset time; a third acquisition unit configured to acquire the volume of electrolyte in a positive electrolyte storage tank 3, the volume of electrolyte in a negative electrolyte storage tank 4, the volume of electrolyte flowing into the positive electrolyte storage tank 3 and the volume of electrolyte flowing into the negative electrolyte storage tank 4 at every a preset time; a first processing unit configured to obtain SOC of the flow battery according to the volume of the electrolyte in the positive electrolyte storage tank 3, the volume of the electrolyte in the negative electrolyte storage tank 4, the volume of the electrolyte flowing into the positive electrolyte storage tank 3 and the volume of the electrolyte flowing into the negative electrolyte storage tank 4, which are acquired by the third acquisition unit at each time, and the SOCs at the electrolyte outlets of the cell stack 6, which are obtained by the SOC detection device 8 at each time, and in combination with the SOCs at the electrolyte outlets of the cell stack 6 under the initial state of the flow battery. Further, the first processing unit calculates the SOC of the flow battery according to the following formula:

$$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$

$$\frac{\Delta V_1}{V_1} * \left(1 - \frac{\Delta V_2}{V_2}\right) * \left(1 - \frac{\Delta V_3}{V_3}\right) * \ldots * \left(1 - \frac{\Delta V_i}{V_i}\right) * \ldots * \left(1 - \frac{\Delta V_n}{V_n}\right) * SOC_1 +$$

$$\frac{\Delta V_2}{V_2} * \left(1 - \frac{\Delta V_3}{V_3}\right) * \left(1 - \frac{\Delta V_4}{V_4}\right) * \ldots * \left(1 - \frac{\Delta V_i}{V_i}\right) * \ldots * \left(1 - \frac{\Delta V_n}{V_n}\right) * SOC_2 +$$

$$\ldots + \frac{\Delta V_i}{V_i} * \left(1 - \frac{\Delta V_{i+1}}{V_{i+1}}\right) * \left(1 - \frac{\Delta V_{i+2}}{V_{i+2}}\right) * \ldots * \left(1 - \frac{\Delta V_n}{V_n}\right) * SOC_i +$$

$$\ldots + \frac{\Delta V_{n-1}}{V_{n-1}} * \left(1 - \frac{\Delta V_n}{V_n}\right) * SOC_{n-1} + \frac{\Delta V_n}{V_n} * SOC_n$$

in the formula, $$V_i = \frac{V_{pi} + V_{ni}}{2}, \Delta V_i = \frac{\Delta V_{pi} + \Delta V_{ni}}{2},$$

wherein $V_{pi}$ represent the volume of the electrolyte in the positive electrolyte storage tank after the elapse of time i*Δt from the operation of the flow battery; $V_{ni}$ represents the volume of the electrolyte in the negative electrolyte storage tank after the elapse of time i*Δt; $\Delta V_{pi}$ represents the volume of the electrolyte flowing into the positive electrolyte storage tank within the ith Δt time; $\Delta V_{ni}$ represents the volume of the electrolyte flowing into the negative electrolyte storage tank within the ith Δt time; $SOC_i$ represents the SOC at the electrolyte outlet of the cell stack obtained by the SOC detection device after the elapse of time i*Δt; $\Delta V_{pi}$ from the operation the flow battery; i is 1, 2, . . . n; n represents the number of the Δt time elapsed. The SOC detection device 8 of the present invention can obtain the SOC of the flow battery SOC by making a difference between a potential at the positive electrolyte outlet of the cell stack 6 and a potential at the negative electrolyte outlet of the cell stack 6. A liquid level detection device is disposed in the positive electrolyte storage tank 3 and/or the negative electrolyte storage tank 4. The volume of the electrolyte in the positive electrolyte storage tank 3 can be obtained from the liquid level of the positive electrolyte obtained by the liquid level detection device, in combination with the bottom area of the positive electrolyte storage tank 3. The volume of the electrolyte in the negative electrolyte storage tank 4 can be obtained from the liquid level of the negative electrolyte obtained by the liquid level detection device, in combination with the bottom area of the negative electrolyte storage tank 4. The volume of the electrolyte flowing into the cell stack 6 from the positive electrolyte storage tank 3 or the negative electrolyte storage tank 4 can be obtained by electrolyte instantaneous flow rate*time. The SOC detection device 8 can obtain the SOC at the electrolyte outlet of the cell stack 6 according to a potential difference between the positive electrolyte outlet and the negative electrolyte outlet of the cell stack 6. The initial state of the flow battery is a state before the operation of the flow battery. SOC0 is the SOC of the flow battery in the initial state of the flow battery.

$$V_1 = \frac{V_{p1} + V_{n1}}{2}; \Delta V_1 = \frac{\Delta V_{p1} + \Delta V_{n1}}{2}; V_2 = \frac{V_{p2} + V_{n2}}{2};$$

$$\Delta V_2 = \frac{\Delta V_{p2} + \Delta V_{n2}}{2}; V_3 = \frac{V_{p3} + V_{n3}}{2}; \Delta V_3 = \frac{\Delta V_{p3} + \Delta V_{n3}}{2}.$$

In this embodiment, the factor that the SOCs of the electrolyte in the positive electrolyte storage tank 3 and the electrolyte in the negative electrolyte storage tank 4 are distributed in a gradient when the flow battery is charged and discharged are taken into consideration, the SOC detection results of the positive electrolyte storage tank 3 and negative electrolyte storage tank 4 within a certain period of time are accumulated and averaged, so that the SOC detection results are more accurate. The flow battery as shown in FIG. 7 further comprises a circulation pump 5.

Figure 8:
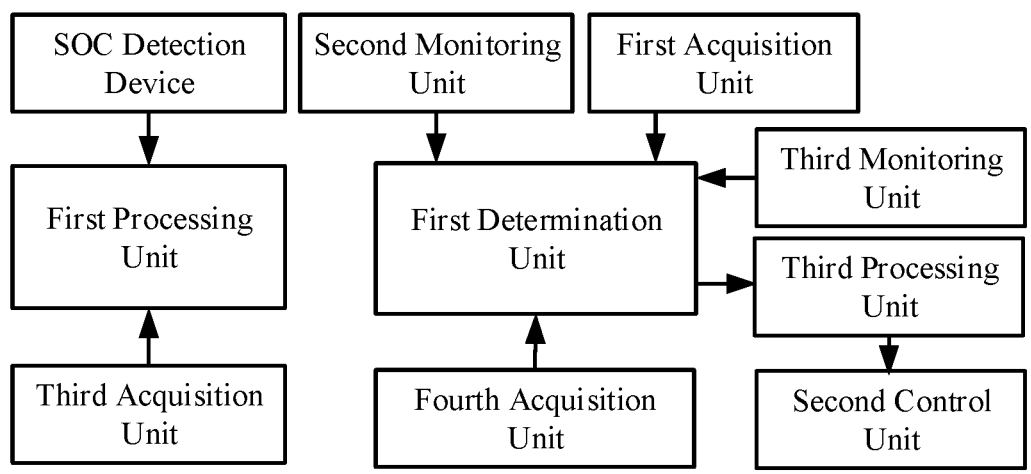
FIG. 8 is a structural block diagram of a flow battery control system according to Embodiment 2 of the present invention.

FIG. 8 is a structural block diagram of a flow battery control system according to Embodiment 2 of the present invention. This embodiment is a preferred embodiment which is further improved on the basis of Embodiment 1. As shown in FIG. 8, the control system further comprises: a first acquisition unit configured to acquire a current electrolyte capacity decay rate of the flow battery; a second monitoring unit configured to detect an electrolyte temperature; a third monitoring unit configured to detect SOC of the flow battery; a fourth acquisition unit configured to acquire a current charge power or discharge power of the flow battery; a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs; a third processing unit connected with the first determination unit and configured to obtain an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and a second control unit connected with the third processing unit and configured to adjust the current electrolyte flow rate of the flow battery to obtain the optimal electrolyte flow rate. Specifically, the corresponding relationship among the electrolyte temperature interval, the SOC interval, the charge power interval, the capacity decay rate interval and the optimal electrolyte flow rate, and the corresponding relationship among the electrolyte temperature interval, the SOC interval, the discharge power interval, the capacity decay rate interval and the optimal electrolyte flow rate are determined and stored in advance. Specifically, the electrolyte temperature may be divided in intervals according to 1 to 50° C. The SOC interval may be divided in intervals according to 1 to 50%. The charge power or the discharge power may be divided in intervals according to 20 to 125 kW. The capacity decay rate may be divided in intervals according to 5 to 15%. The specific determination process of the corresponding relationship among the electrolyte temperature interval, the SOC interval, the charge power interval, the capacity decay rate interval and the optimal electrolyte flow rate is as follows: performing charging experiments respectively under different electrolyte temperature intervals, SOC intervals, capacity decay rate intervals, and charge power intervals to determine the optimal electrolyte flow rate under the corresponding conditions. The optimal electrolyte flow rate under each electrolyte temperature interval, SOC interval, capacity decay rate interval, and charge power interval is obtained by setting different electrolyte flow rates under the electrolyte temperature interval, the SOC interval, the capacity decay rate interval, and the charge power interval, such that the electrolyte flow rate corresponding to the charging experiment in which the energy efficiency and the electrolyte utilization rate are optimal is the optimal electrolyte flow rate. The specific determination process of the corresponding relationship among the electrolyte temperature interval, the SOC interval, the discharge power interval, the capacity decay rate interval, and the optimal electrolyte flow rate is as follows: performing discharging experiments respectively under different electrolyte temperature intervals, SOC intervals, capacity decay rate intervals, and discharge power intervals to determine the optimal electrolyte flow rate under the corresponding conditions. The optimal electrolyte flow rate under each electrolyte temperature interval, SOC interval, capacity decay rate interval, and discharge power interval is obtained by setting different electrolyte flow rates under the electrolyte temperature interval, the SOC interval, the capacity decay rate interval, and the discharge power interval, such that the electrolyte flow rate corresponding to the discharging experiment in which the energy efficiency and the electrolyte utilization rate are optimal is the optimal electrolyte flow rate. Specifically, the corresponding relationship between the electrolyte flow rate and the electrolyte temperature interval, the SOC interval, the capacity decay rate interval, and the charge power interval or the discharge power interval is as shown in Table 1, wherein [T1, T2], [T2, T3] are examples of the electrolyte temperature interval; [SOC1, SOC2], [SOC2, SOC3], and [SOC3, SOC4] are examples of the SOC interval; [R1, R2], [R2, R3] are examples of the capacity decay rate interval. [P1, P2], [P2, P3], and [P3, P4] are examples of the charging power interval or the discharge power interval; F1 to F36 are examples of the electrolyte flow rate.

TABLE 1

Example Table of Corresponding Relationship Between Electrolyte Flow Rate, Electrolyte Temperature Interval, SOC Interval, Capacity Decay Rate Interval, and Charge Power Interval or Discharge Power Interval

| | | | [P1, P2] | [P2, P3] | [P3, P4] |
|---|---|---|---|---|---|
| [T1, T2] | [SOC1, SOC2] | [R1, R2] | F1 | F2 | F3 |
| | | [R2, R3] | F4 | F5 | F6 |
| | [SOC2, SOC3] | [R1, R2] | F7 | F8 | F9 |
| | | [R2, R3] | F10 | F11 | F12 |
| | [SOC3, SOC4] | [R1, R2] | F13 | F14 | F15 |
| | | [R2, R3] | F16 | F17 | F18 |
| [T2, T3] | [SOC1, SOC2] | [R1, R2] | F19 | F20 | F21 |
| | | [R2, R3] | F22 | F23 | F24 |
| | [SOC2, SOC3] | [R1, R2] | F25 | F26 | F27 |
| | | [R2, R3] | F28 | F29 | F30 |
| | [SOC3, SOC4] | [R1, R2] | F31 | F32 | F33 |
| | | [R2, R3] | F34 | F35 | F36 |

Since the demands of different electrolyte temperatures, SOCs, capacity decay rates, and charge and discharge powers on reactants of the electrolyte are different during the operation of the flow battery, in this embodiment of the present invention, corresponding electrolyte flow rates can be controlled according to different operating state parameters of the flow battery, continuous operation of the flow battery under an optimal condition can be ensured, the flow rate requirements of the flow battery can be satisfied, and the power consumption of the circulation pump can be reduced.

Figure 9:
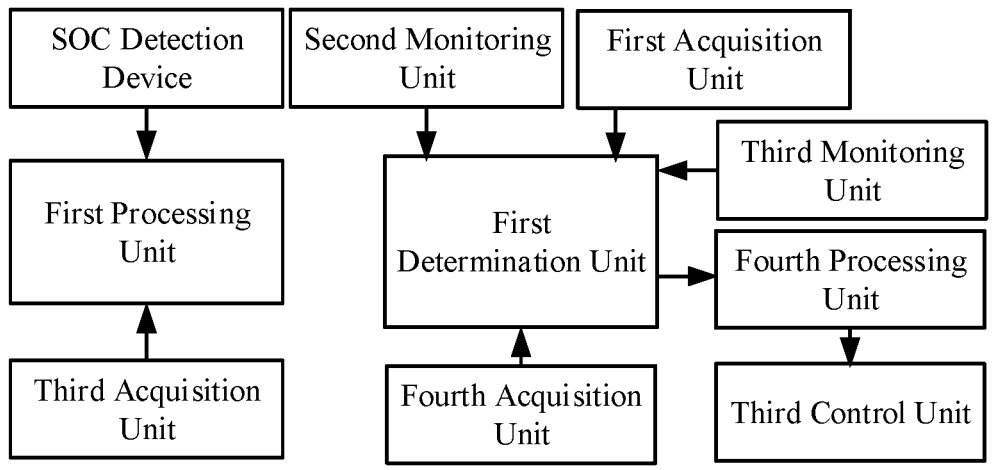
FIG. 9 is a structural block diagram of a flow battery control system according to Embodiment 3 of the present invention.

FIG. 9 is a structural block diagram of a flow battery control system according to Embodiment 3 of the present invention. This embodiment is a preferred embodiment which is further improved on the basis of Embodiment 1. As shown in FIG. 9, the control system further comprises: a first acquisition unit configured to acquire a current electrolyte capacity decay rate of the flow battery; a second monitoring unit configured to detect an electrolyte temperature; a third monitoring unit configured to detect SOC of the flow battery; a fourth acquisition unit configured to acquire a current charge power or discharge power of the flow battery; a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs; a fourth processing unit connected with the first determination unit and configured to obtain a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte. The corresponding relationship among the electrolyte temperature interval, the SOC interval, the charge power interval, the capacity decay rate interval and the optimal difference between volumes of the positive electrolyte and the negative electrolyte, and the corresponding relationship among the electrolyte temperature interval, the SOC interval, the discharge power interval, the capacity decay rate interval and the optimal difference between volumes of the positive electrolyte and the negative electrolyte are determined and stored in advance. Specifically, the electrolyte temperature may be divided in intervals according to 1 to 50° C. The SOC interval is divided in intervals according to 1 to 50%. The charge power or the discharge power may be divided in intervals according to 20 to 125 kW. The capacity decay rate may be divided in intervals according to 5 to 15%. The specific determination process of the corresponding relationship among the electrolyte temperature interval, the SOC interval, the charge power interval, the capacity decay rate interval and the optimal difference between volumes of the positive electrolyte and the negative electrolyte is as follows: performing charging experiments respectively under different electrolyte temperature intervals, SOC intervals, capacity decay rate intervals, and charge power intervals to determine the optimal difference between volumes of the positive electrolyte and the negative electrolyte under the corresponding conditions. The optimal difference between volumes of the positive electrolyte and the negative electrolyte under each electrolyte temperature interval, SOC interval, capacity decay rate interval, and charge power interval is obtained by setting different optimal differences between volumes of the positive electrolyte and the negative electrolyte (the difference between volume of the electrolyte in the positive electrolyte storage tank and the volume of the electrolyte in the negative electrolyte storage tank) under the electrolyte temperature interval, the SOC interval, the capacity decay rate interval, and the charge power interval, such that optimal difference between volumes of the positive electrolyte and the negative electrolyte corresponding to the charging experiment in which the energy efficiency and the electrolyte utilization rate are optimal is the optimal difference between volumes of the positive electrolyte and the negative electrolyte. The specific determination process of the corresponding relationship among the electrolyte temperature interval, the SOC interval, the discharge power interval, the capacity decay rate interval, and the optimal difference between volumes of the positive electrolyte and the negative electrolyte is as follows: performing discharging experiments respectively under different electrolyte temperature intervals, SOC intervals, capacity decay rate intervals, and discharge power intervals to determine the optimal difference between volumes of the positive electrolyte and the negative electrolyte under the corresponding conditions.

The optimal difference between volumes of the positive electrolyte and the negative electrolyte under each electrolyte temperature interval, SOC interval, capacity decay rate interval, and discharge power interval is obtained by setting different optimal differences between volumes of the positive electrolyte and the negative electrolyte under the electrolyte temperature interval, the SOC interval, the capacity decay rate interval, and the discharge power interval, such that the optimal difference between volumes of the positive electrolyte and the negative electrolyte corresponding to the discharging experiment in which the energy efficiency and the electrolyte utilization rate are optimal is the optimal difference between volumes of the positive electrolyte and the negative electrolyte. Since the demands of different electrolyte temperatures, SOCs, capacity decay rates, and charge and discharge powers on reactants of the electrolyte are different during the operation of the flow battery, in this embodiment of the present invention, corresponding optimal difference between volumes of the positive electrolyte and the negative electrolyte can be controlled according to different operating state parameters of the flow battery, continuous operation of the flow battery under an optimal condition can be ensured, the flow rate requirements of the flow battery can be satisfied, and the power consumption of the circulation pump can be reduced.

Figure 10:
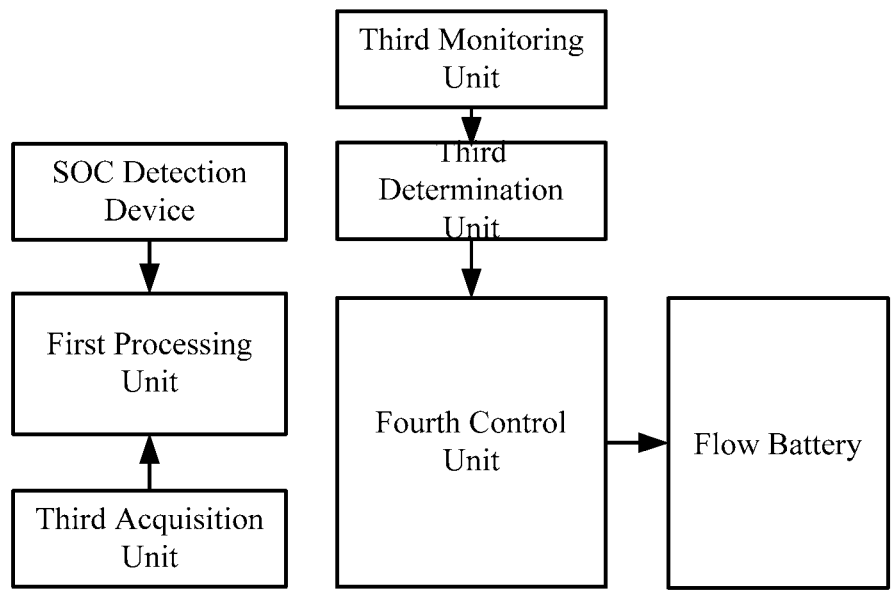
FIG. 10 is a structural block diagram of a flow battery control system according to Embodiment 4 of the present invention.

FIG. 10 is a structural block diagram of a flow battery control system according to Embodiment 4 of the present invention. This embodiment is a preferred embodiment which is further improved on the basis of Embodiment 1. A shown in FIG. 10, the control system further comprises: a third monitoring unit configured to detect SOC of the flow battery; a third determination unit connected with the third monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit; and a fourth control unit connected with the third determination unit and configured to adjust a voltage of the flow battery to be lower than a first preset voltage when the SOC of the flow battery is greater than or equal to the SOC upper limit, and adjust the voltage of the flow battery to be between the first preset voltage and a second preset voltage when the SOC of the flow battery is less than or equal to the SOC lower limit, the second preset voltage being higher than the first preset voltage. Preferably, the SOC lower limit of the flow battery is 30%; the SOC upper limit is 80%; the first preset voltage is 1.55V*m, and the second preset voltage is 1.6V*m, wherein m is the number of battery cells included in the flow battery. When the sections of the battery cells are different from the number of the battery cells, the first preset voltage and the second preset voltage are also different correspondingly. The flow battery of this embodiment comprises at least one cell stack which consists of battery cells or is formed by connecting a plurality of battery cells in series. According to this embodiment, it is possible to configure the upper limit of a voltage of the flow battery according to the specific SOC conditions of the flow battery, and the problem that the flow battery is prone to side reactions under a high SOC condition and capacity decay while charged for a long time under a high SOC condition can be avoided. Meanwhile, the charge capacity can be increased by increasing the voltage upper limit on the premise that the voltage of the flow battery is endurable.

Figure 11:
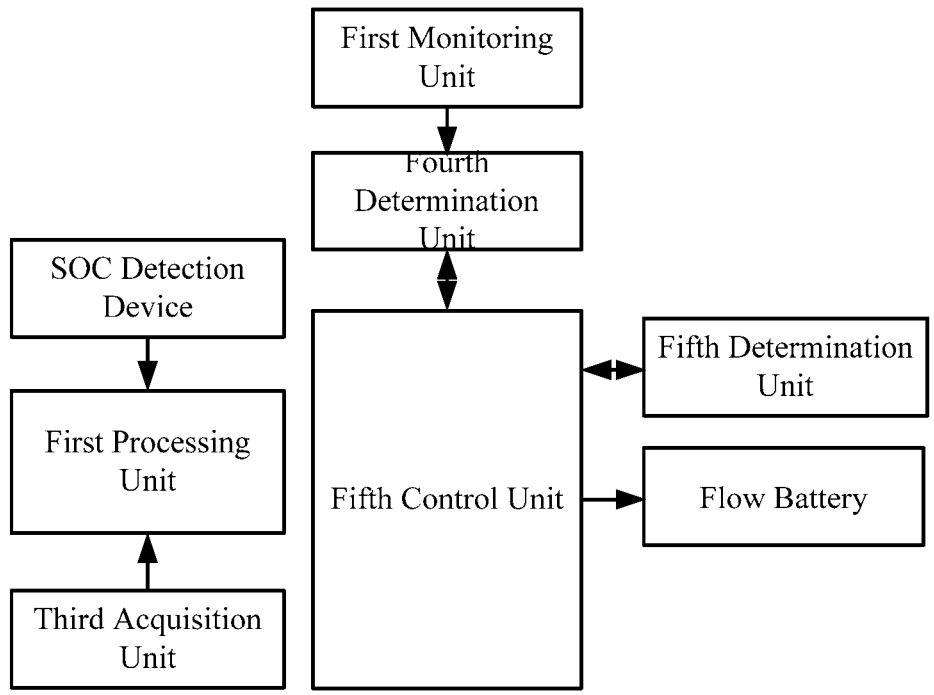
FIG. 11 is a structural block diagram of a flow battery control system according to Embodiment 5 of the present invention.

FIG. 11 is a structural block diagram of a flow battery control system according to Embodiment 5 of the present invention. This embodiment is a preferred embodiment which is further improved on the basis of Embodiment 1. As shown in FIG. 11, the control system further comprises: a first monitoring unit configured to detect a voltage of the flow battery and a voltage of each cell stack included in the flow battery; a fourth determination unit connected with the first monitoring unit and configured to determine whether the difference between the voltages of any two cell stacks is greater than or equal to a first voltage threshold; a fifth control unit connected with the fourth determination unit and configured to, after the fourth determination unit obtains a determination result that the difference between the voltages of any two cell stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state; and a fifth determination unit connected with the fifth control unit and configure to, after the fifth control unit lowers the upper limit of the charge voltage of the flow battery and adjusts the charge current of the flow battery, or lowers the upper limit of the charge voltage of the flow battery and adjusts the charge current of the flow battery, determine whether the difference between the voltages of any two cell stacks is greater than or equal to a second voltage threshold; the fifth control unit controls the flow battery to power off according to the determination result obtained by the fifth determination unit that the difference between the voltages of any two cell stacks is greater than or equal to the second voltage threshold; the fourth determination unit is configured to, after the fifth determination unit obtains a determination result that the difference between the voltages of any two cell stacks is less than the second voltage threshold, continue to determine whether the difference between the voltages of any two cell stacks is greater than or equal to the first voltage threshold. Specifically, when the operation of lowering the upper limit of the charge voltage of the flow battery or increasing the lower limit of the discharge voltage of the flow battery is performed, the upper limit of the charge voltage can be lowered by 0.5 V or the lower limit of the discharge voltage can be increased by 0.5 V each time. In the actual application, taking a 500 kW flow battery as an example, the first voltage threshold here may be in the range of 3 to 10 V, and the second voltage threshold may be in the range of 5 to 15 V. In this embodiment, the upper limit of the charge voltage and the lower limit of the discharge voltage can be adjusted according to the difference between the actual voltages of the cell stacks. Here, the charge current or the discharge current of the flow battery is adjusted to lower the charge current or the discharge current of the flow battery.

Figure 12:
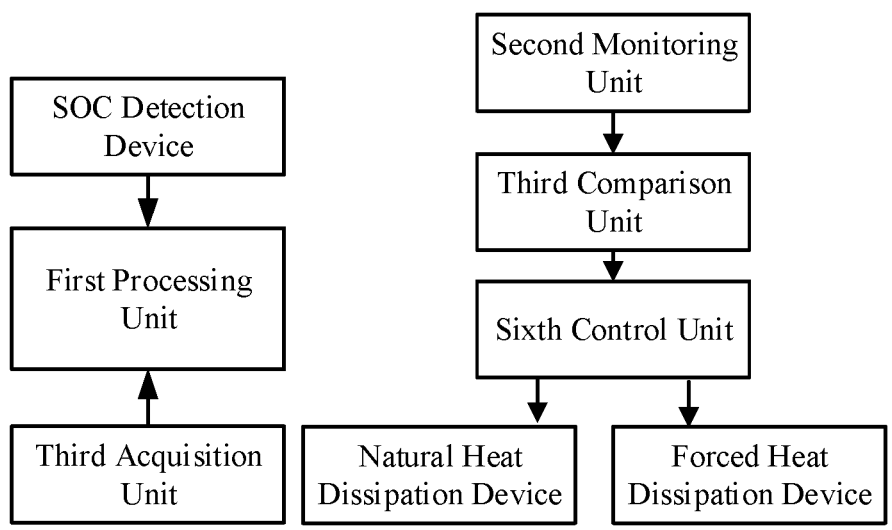
FIG. 12 is a structural block diagram of a flow battery control system according to Embodiment 6 of the present invention.

FIG. 12 is a structural block diagram of a flow battery control system according to Embodiment 6 of the present invention. This embodiment is a preferred embodiment which is further improved on the basis of Embodiment 1. As shown in FIG. 12, the control system further comprises: a second monitoring unit configured to detect an electrolyte temperature; a natural heat dissipation device and a forced heat dissipation device; a third comparison unit connected with the second monitoring unit and configured to compare the electrolyte temperature detected by the second monitoring unit with a temperature upper limit and a temperature lower limit respectively; and a sixth control unit connected with the third comparison unit and configured to control the natural heat dissipation device to work when the flow battery operates, initiate the forced heat dissipation device when the electrolyte temperature reaches the temperature upper limit and powers off the forced heat dissipation device when the electrolyte temperature reaches the temperature lower limit. In this embodiment, the problem that the flow battery generates a certain amount of heat during the charging and discharging operations, and the heat which cannot be dissipated in time will harm pipe fitting materials of the flow battery can be solved, such that the heat generated in the operation process of the flow battery can be effectively dissipated. The natural heat dissipation device of the present invention is a ventilation device such as a fan disposed around the flow battery. Heat generated by the flow battery in the operation process of the flow battery is taken away by the ventilation device in a ventilation manner, such that a space for temperature rise during the high-temperature operation is reserved, and the power consumption of forced heat dissipation is reduced. The forced heat dissipation device is an air-cooled heat exchanger or a compression refrigerator.

Figure 13:
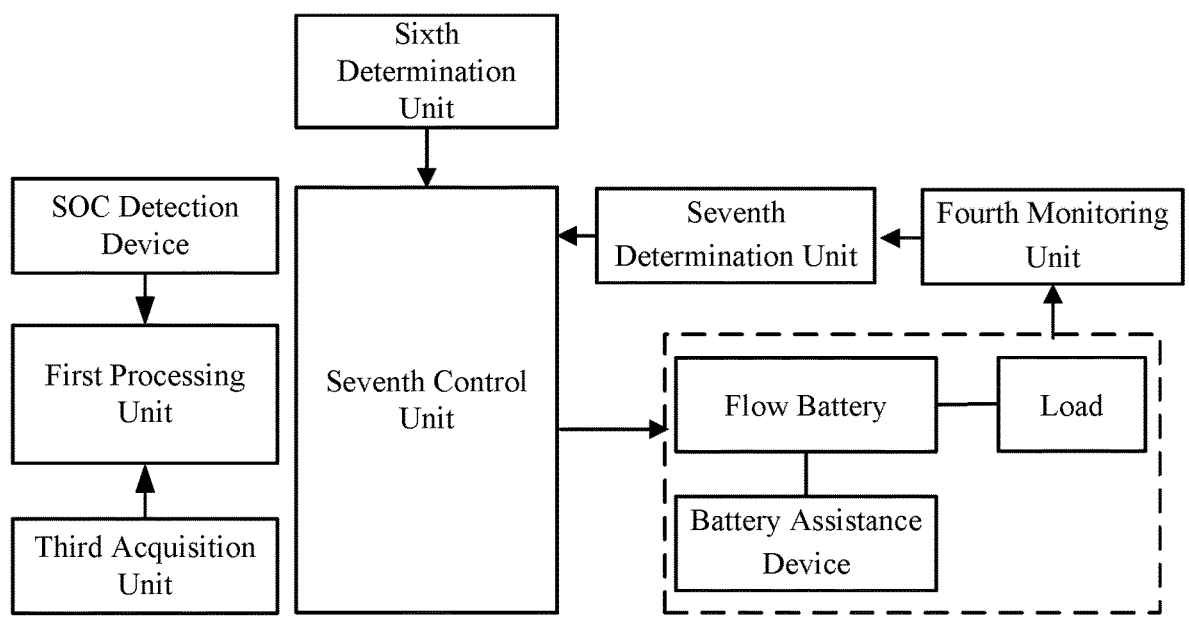
FIG. 13 is a structural block diagram of a flow battery control system according to Embodiment 7 of the present invention.

FIG. 13 is a structural block diagram of a flow battery control system according to Embodiment 7 of the present invention. This embodiment is a preferred embodiment which is further improved on the basis of Embodiment 1. As shown in FIG. 13, the control system further comprises: a sixth determination unit configured to determine whether the flow battery is powered off; a seventh control unit connected with the sixth determination unit and configured to control the flow battery to continue to supply electric energy to a load and/or a battery assistance device after the flow battery is powered off, wherein the load is a load which is connected when the flow battery operates normally; after the flow battery is powered off, if the flow battery does not supply electric energy to the load and/or the battery assistance device, the seventh control unit performs a forced electric leakage protection operation on the flow battery; a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold; when the discharge power of the flow battery reaches the discharge power threshold, the seventh control unit performs the forced electric leakage protection operation on the flow battery or the control system stops working. The step of performing the forced electric leakage protection specifically refers to controlling the cell stacks of the flow battery to be disconnected from each other. After the flow battery system is powered off, a poweroff signal is sent to the sixth determination unit. After the flow battery is powered off, the circulation pump stops working, and the remaining electric energy in the cell stacks will be released by the load and/or the battery assistance device in this embodiment. The discharge power threshold is generally 5% to 100% of the rated power. When the discharge power threshold is reached, the cell stacks of the flow battery can be controlled to be disconnected to achieve further protection, or can be directly powered off when the discharge power threshold is reached. In this embodiment, the problems of damaging the cell stacks caused by the release of electrical energy in the cell stacks in the form of leakage current and shortening the life of the flow battery are avoided. The direct use of the load of the flow battery itself also solves the problem that more external auxiliary devices and systems required when the flow battery system is discharged by using external resistors are large-sized and complicated, and convenient for maintenance and repair. At the same time, after controlling the flow battery to discharge for the load, it is determined in real time whether the flow battery system is discharging for the load. When it is detected that the flow battery system does not perform a discharge operation for the load, the forced electric leakage protection is performed. Specifically, the forced leakage protection can be realized by controlling a DC contactor between the cell stacks of the flow battery system to be switched off, thereby realizing forced electric leakage protection after the discharge by poweroff of the flow battery system fails. In addition, when the discharge stop condition is reached, the operation of controlling the discharge stop can also be completed by controlling the DC contactor between the cell stacks of the flow battery system to be switched off, thereby achieving further protection.

The present invention further provides a flow battery. The flow battery includes the flow battery control system of any one of the preceding embodiments. Any combination of the above embodiments is encompassed within the scope of the utility model.

The above description refers only to preferred embodiments of the present invention, but the protection scope of protection of the present invention is not limited thereto. Any equivalents or modifications of the technical solutions and the inventive concepts of the present invention made by those skilled in the art within the technical range of the present invention are intended to be included within the protection scope of the present invention.

The invention claimed is:

1. A flow battery control method, comprising:
   step B1: disposing a first SOC detection device at a positive electrolyte outlet of a cell stack and a second SOC detection device at a negative electrolyte outlet of the cell stack;
   step B2: measuring, at a preset frequency, SOCs at the positive electrolyte outlet and at the negative electrolyte outlet of the cell stack using the first SOC device and the second SOC device, respectively, wherein the preset frequency is the inverse of $\Delta t$, which is the lapse of time between two consecutive measurements;
   step B3: measuring, at the preset frequency, a volume of electrolyte in the positive electrolyte storage tank, a volume of electrolyte in the negative electrolyte storage tank, a volume of the electrolyte flowing into the positive electrolyte storage tank, and a volume of the electrolyte flowing into the negative electrolyte storage tank; and
   step B4: calculating a SOC of the flow battery according to the following equation:

$$SOC = \left(1 - \frac{\Delta V_1}{V_1}\right) * \left(1 - \frac{\Delta V_2}{V_2}\right) * \ldots * \left(1 - \frac{\Delta V_i}{V_i}\right) * \ldots * \left(1 - \frac{\Delta V_n}{V_n}\right) * SOC_0 +$$
$$\frac{\Delta V_1}{V_1} * \left(1 - \frac{\Delta V_2}{V_2}\right) * \left(1 - \frac{\Delta V_3}{V_3}\right) * \ldots * \left(1 - \frac{\Delta V_i}{V_i}\right) * \ldots * \left(1 - \frac{\Delta V_n}{V_n}\right) * SOC_1 +$$
$$\frac{\Delta V_2}{V_2} * \left(1 - \frac{\Delta V_3}{V_3}\right) * \left(1 - \frac{\Delta V_4}{V_4}\right) * \ldots * \left(1 - \frac{\Delta V_i}{V_i}\right) * \ldots * \left(1 - \frac{\Delta V_n}{V_n}\right) * SOC_2 +$$
$$\ldots + \frac{\Delta V_i}{V_i} * \left(1 - \frac{\Delta V_{i+1}}{V_{i+1}}\right) * \left(1 - \frac{\Delta V_{i+2}}{V_{i+2}}\right) * \ldots * \left(1 - \frac{\Delta V_n}{V_n}\right) * SOC_i +$$
$$\ldots + \frac{\Delta V_{n-1}}{V_{n-1}} * \left(1 - \frac{\Delta V_n}{V_n}\right) * SOC_{n-1} + \frac{\Delta V_n}{V_n} * SOC_n,$$

$$V_i = \frac{V_{pi} + V_{ni}}{2}, \Delta V_i = \frac{\Delta V_{pi} + \Delta V_{ni}}{2},$$

wherein, $V_{pi}$ represents the volume of the electrolyte in the positive electrolyte storage tank after an elapse of time $i*\Delta t$, $V_{ni}$ represents the volume of the electrolyte in the negative electrolyte storage tank after the elapse of time $i*\Delta t$, $\Delta VD_{pi}$ represents the volume of the electrolyte flowing into the positive electrolyte storage tank during the ith period of $\Delta t$, $\Delta V_{ni}$ represents the volume of the electrolyte flowing into the negative electrolyte storage tank during the ith period of $\Delta t$; $SOC_i$ represents the SOC at the electrolyte outlet of the cell stack obtained by the SOC detection device at the elapse of time $i*\Delta t$; i is an integer from 1 to n, and n is the number of $\Delta t$ between the first measurement and the last measurement by the first SOC detection device and the second SOC detection device.

2. The flow battery control method according to claim 1, further comprising:
   step F1: acquiring a current electrolyte temperature, the SOC, a charge power or discharge power, and an electrolyte capacity decay rate of the flow battery;
   step F2: determining an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;
   step F3: obtaining an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and
   step F4: adjusting the current electrolyte flow rate of the flow battery to obtain the optimal electrolyte flow rate.

3. The flow battery control method according to claim 1, further comprising:
   step G1: acquiring a current electrolyte temperature, the SOC, a charge power or discharge power, and an electrolyte capacity decay rate of the flow battery;
   step G2: determining an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;
   step G3: obtaining a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and step G4: adjusting the current difference between the volumes of the positive electrolyte and the negative electrolyte of the flow battery to obtain the optimal difference between volumes of the positive electrolyte and the negative electrolyte.

4. The flow battery control method according to claim 1, further comprising:

step H1: obtaining the SOC of the flow battery; and step H2: when the SOC of the flow battery is between an SOC lower limit and an SOC upper limit, executing step H3, or executing step H4;

wherein step H3 is keeping a voltage of the flow battery unchanged and step H4 is adjusting a voltage of the flow battery to be lower than a first preset voltage when the SOC of the flow battery is greater than or equal to the SOC upper limit, and adjusting the voltage of the flow battery to be between the first preset voltage and a second preset voltage when the SOC of the flow battery is less than or equal to the SOC lower limit, the second preset voltage being higher than the first preset voltage.

5. The flow battery control method according to claim 1, further comprising:

step I1: detecting a voltage of the flow battery and a voltage of each cell stack in the flow battery;

step I2: when a difference between the voltages of any two cell stacks is greater than or equal to a first voltage threshold, executing step I3, or returning to step I2; wherein step I3 is lowering the upper limit of a charge voltage of the flow battery and adjusting a charge current of the flow battery when the flow battery is in a charging state, and increasing the lower limit of a discharge voltage of the flow battery and adjusting a discharge current of the flow battery when the flow battery is in a discharging state; and step I4: when the difference between the voltages of any two cell stacks is greater than or equal to a second voltage threshold, powering off the flow battery, or returning to step I2.

6. The flow battery control method according to claim 1, further comprising:

detecting a temperature of the electrolyte;

initiating a forced heat dissipation device when the electrolyte temperature reaches a temperature upper limit; or powering off the forced heat dissipation device when the electrolyte temperature reaches a temperature lower limit.

7. The flow battery control method according to claim 1, further comprising:

step K1: powering off the flow battery;

step K2: controlling the flow battery to continue to supply electric energy to a load and/or a battery assistance device, wherein the load is connected to the flow battery;

step K3: when the flow battery supplies electric energy to the load and/or the battery assistance device, executing step K4 and step K5, or executing step K7; wherein step K4 is detecting a discharge power of the flow battery, and step K5 is when the discharge power of the flow battery reaches a discharge power threshold, executing step K7 or returning to step K3, and step K7 is executing forced electric leakage protection.

8. A flow battery control system, comprising:

a first SOC detection device disposed at a positive electrode outlet and a second SOC detection device disposed at a negative electrolyte outlet of a cell stack, wherein the first SOC detection device and the second SOC detection device are configured to measure SOCs at the positive electrolyte outlet and the negative electrolyte of the cell stack, respectively, at a preset frequency, wherein the preset frequency is the inverse of $\Delta t$, which is the lapse of time between two consecutive measurements;

a third acquisition unit configured to measure a volume of electrolyte in a positive electrolyte storage tank, a volume of electrolyte in a negative electrolyte storage tank, a volume of electrolyte flowing into the positive electrolyte storage tank, and a volume of electrolyte flowing into the negative electrolyte storage tank at the preset frequency; and a first processing unit configured to calculate the SOC of the flow battery according to the following equation:

$$SOC = \left(1 - \frac{\Delta V_1}{V_1}\right)*\left(1 - \frac{\Delta V_2}{V_2}\right)*\ldots*\left(1 - \frac{\Delta V_i}{V_i}\right)*\ldots*\left(1 - \frac{\Delta V_n}{V_n}\right)*SOC_0 +$$

$$\frac{\Delta V_1}{V_1}*\left(1 - \frac{\Delta V_2}{V_2}\right)*\left(1 - \frac{\Delta V_3}{V_3}\right)*\ldots*\left(1 - \frac{\Delta V_i}{V_i}\right)*\ldots*\left(1 - \frac{\Delta V_n}{V_n}\right)*SOC_1 +$$

$$\frac{\Delta V_2}{V_2}*\left(1 - \frac{\Delta V_3}{V_3}\right)*\left(1 - \frac{\Delta V_4}{V_4}\right)*\ldots*\left(1 - \frac{\Delta V_i}{V_i}\right)*\ldots*\left(1 - \frac{\Delta V_n}{V_n}\right)*SOC_2 +$$

$$\ldots + \frac{\Delta V_i}{V_i}*\left(1 - \frac{\Delta V_{i+1}}{V_{i+1}}\right)*\left(1 - \frac{\Delta V_{i+2}}{V_{i+2}}\right)*\ldots*\left(1 - \frac{\Delta V_n}{V_n}\right)*SOC_i +$$

$$\ldots + \frac{\Delta V_{n-1}}{V_{n-1}}*\left(1 - \frac{\Delta V_n}{V_n}\right)*SOC_{n-1} + \frac{\Delta V_n}{V_n}*SOC_n,$$

$$V_i = \frac{V_{pi} + V_{ni}}{2}, \Delta V_i = \frac{\Delta V_{pi} + \Delta V_{ni}}{2},$$

wherein $V_{pi}$ represents the volume of the electrolyte in the positive electrolyte storage tank after an elapse of time $i*\Delta t$, $V_{ni}$ represents the volume of the electrolyte in the negative electrolyte storage tank after the elapse of time $i*\Delta t$; $\Delta V_{pi}$ represents the volume of the electrolyte flowing into the positive electrolyte storage tank during the ith period of $\Delta t$, $\Delta V_{ni}$ represents the volume of the electrolyte flowing into the negative electrolyte storage tank during the ith period of $\Delta t$; $SOC_i$ represents the SOC at the electrolyte outlet of the cell stack obtained by the SOC detection device at the elapse of time $i*\Delta t$; i is an integer from 1 to n, and n is the number of $\Delta t$ between the first measurement and the last measurement by the first SOC detection device and the second SOC detection device.

9. The flow battery control system according to claim 8, further comprising:

a first acquisition unit configured to acquire a current electrolyte capacity decay rate of the flow battery;

a second monitoring unit configured to detect an electrolyte temperature;

a third monitoring unit configured to detect the SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;

a third processing unit connected with the first determination unit and configured to obtain an optimal electrolyte flow rate parameter according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal electrolyte flow rate, or in combination with a corresponding relationship among the electrolyte temperature interval, the SOC interval, the discharge power interval, the capacity decay rate interval and the optimal electrolyte flow rate; and a second control unit connected with the third processing unit and configured to adjust the current electrolyte flow rate of the flow battery to obtain the optimal electrolyte flow rate.

10. The flow battery control system according to claim 8, further comprising:

a first acquisition unit configured to acquire a current electrolyte capacity decay rate of the flow battery;

a second monitoring unit configured to detect an electrolyte temperature;

a third monitoring unit configured to detect the SOC of the flow battery;

a fourth acquisition unit configured to acquire a current charge power or discharge power of the flow battery;

a first determination unit connected with the second monitoring unit, the third monitoring unit, the fourth acquisition unit and the first acquisition unit and configured to determine an electrolyte temperature interval to which the current electrolyte temperature of the flow battery belongs, an SOC interval to which the current SOC belongs, a charge power interval to which the current charge power belongs or a discharge power interval to which the current discharge power belongs, and a capacity decay rate interval to which the current electrolyte capacity decay rate belongs;

a fourth processing unit connected with the first determination unit and configured to obtain a parameter of an optimal difference between volumes of positive electrolyte and negative electrolyte according to the determined electrolyte temperature interval, SOC interval, charge power interval or discharge power interval and capacity decay rate interval, and in combination with a corresponding relationship among the electrolyte temperature interval, the SOC interval, the charge power interval, the capacity decay rate interval and an optimal difference between volumes of the positive electrolyte and the negative electrolyte, or in combination with a corresponding relationship among the electrolyte temperature interval, the SOC interval, the discharge power interval, the capacity decay rate interval and the optimal difference between volumes of the positive electrolyte and the negative electrolyte; and a third control unit connected with the fourth processing unit and configured to adjust the current difference between the volumes of the positive electrolyte and the negative electrolyte of the flow battery to obtain the optimal difference between volumes of the positive electrolyte and the negative electrolyte.

11. The flow battery control system according to claim 8, further comprising:

a third monitoring unit configured to detect the SOC of the flow battery;

a third determination unit connected with the third monitoring unit and configured to determine whether the SOC of the flow battery is between an SOC lower limit and an SOC upper limit, wherein the current voltage of the flow battery is kept unchanged when the SOC of the flow battery is between the SOC lower limit and the SOC upper limit; and a fourth control unit connected with the third determination unit and configured to adjust a voltage of the flow battery to be lower than a first preset voltage when the SOC of the flow battery is greater than or equal to the SOC upper limit, and adjust the voltage of the flow battery to be between the first preset voltage and a second preset voltage when the SOC of the flow battery is less than or equal to the SOC lower limit, the second preset voltage being higher than the first preset voltage.

12. The flow battery control system according to claim 8, further comprising:

a first monitoring unit configured to detect a voltage of the flow battery and a voltage of each cell stack included in the flow battery;

a fourth determination unit connected with the first monitoring unit and configured to determine whether the difference between the voltages of any two cell stacks is greater than or equal to a first voltage threshold;

a fifth control unit connected with the fourth determination unit and configured to, after the fourth determination unit obtains a determination result that the difference between the voltages of any two cell stacks is greater than or equal to the first voltage threshold, lower the upper limit of a charge voltage of the flow battery and adjust a charge current of the flow battery when the flow battery is in a charging state, and increase the lower limit of a discharge voltage of the flow battery and adjust a discharge current of the flow battery when the flow battery is in a discharging state; and a fifth determination unit connected with the fifth control unit and configure to, after the fifth control unit lowers the upper limit of the charge voltage of the flow battery and adjusts the charge current of the flow battery, or lowers the upper limit of the charge voltage of the flow battery and adjusts the charge current of the flow battery, determine whether the difference between the voltages of any two cell stacks is greater than or equal to a second voltage threshold, wherein the fifth control unit controls the flow battery to power off according to the determination result obtained by the fifth determination unit that the difference between the voltages of any two cell stacks is greater than or equal to the second voltage threshold; the fourth determination unit is configured to, after the fifth determination unit obtains a determination result that the difference between the voltages of any two cell stacks is less than the second voltage threshold, continue to determine whether the difference between the voltages of any two cell stacks is greater than or equal to the first voltage threshold.

13. The flow battery control system according to claim 8, further comprising:

a second monitoring unit configured to detect an electrolyte temperature;

a natural heat dissipation device and a forced heat dissipation device;

a third comparison unit connected with the second monitoring unit and configured to compare the electrolyte temperature detected by the second monitoring unit with a temperature upper limit and a temperature lower limit respectively; and a sixth control unit connected with the third comparison unit and configured to control the natural heat dissipation device to work when the flow battery operates, initiate the forced heat dissipation device when the electrolyte temperature reaches the temperature upper limit and power off the forced heat dissipation device when the electrolyte temperature reaches the temperature lower limit.

14. The flow battery control system according to claim 8, further comprising:

a sixth determination unit configured to determine whether the flow battery is powered off;

a seventh control unit connected with the sixth determination unit and configured to control the flow battery to continue to supply electric energy to a load and/or a battery assistance device after the flow battery is powered off, wherein the load is a load which is connected when the flow battery operates normally; after the flow battery is powered off, when the flow battery stops supplying electric energy to the load and/or the battery assistance device, the seventh control unit performs a forced electric leakage protection operation on the flow battery;

a fourth monitoring unit configured to, after the flow battery is powered off, detect a discharge power of the flow battery when the flow battery continues to supply electric energy to the load and/or the battery assistance device; and a seventh determination unit connected with the fourth monitoring unit and configured to determine whether the discharge power of the flow battery reaches a discharge power threshold, wherein when the discharge power of the flow battery reaches the discharge power threshold, the seventh control unit performs the forced electric leakage protection operation on the flow battery or the control system stops working.

15. A flow battery, comprising the flow battery control system according to claim 8.

* * * * *